United States Patent Office 3,473,903
Patented Oct. 21, 1969

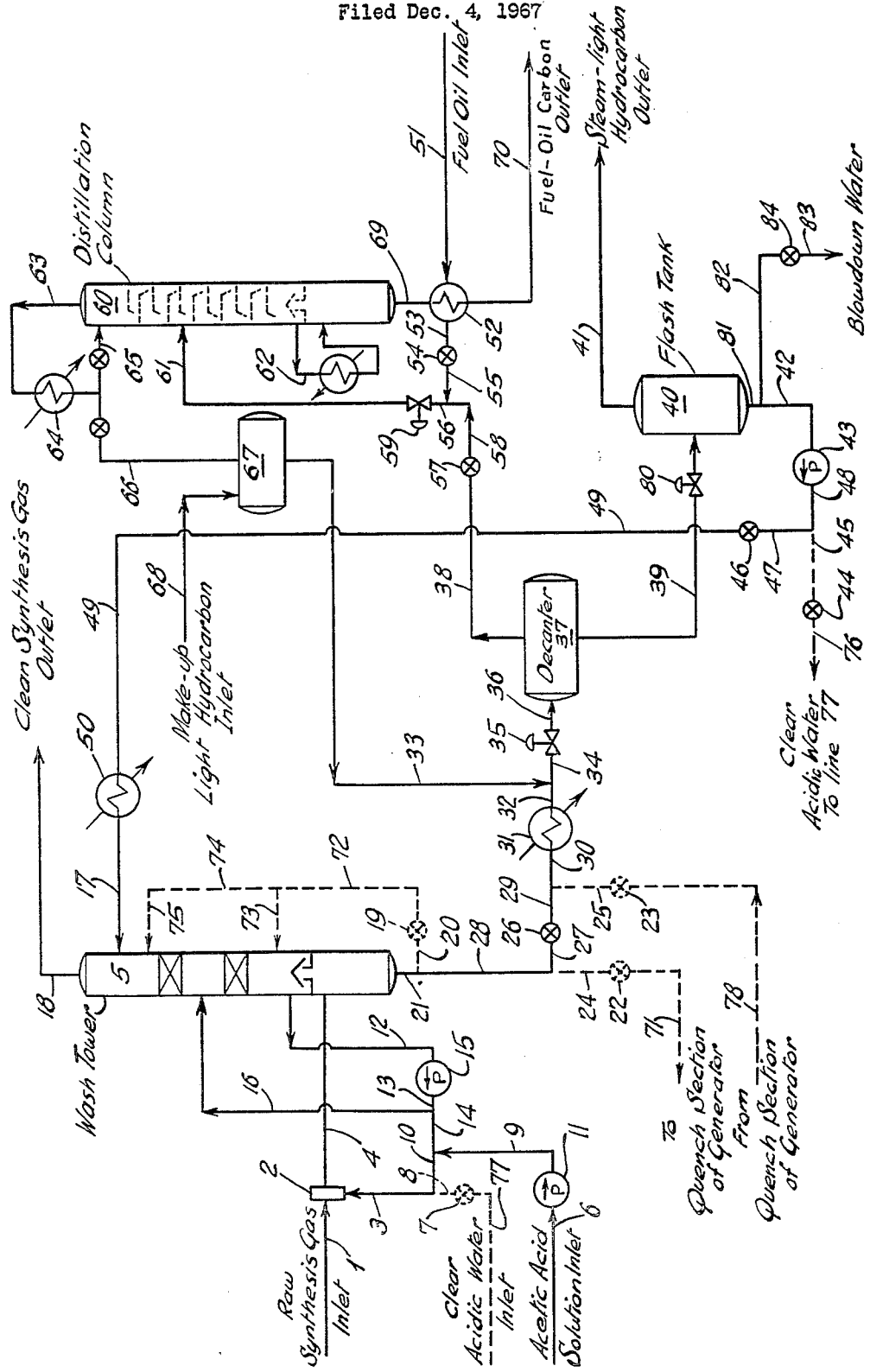

3,473,903
RECOVERY OF CARBON FROM SYNTHESIS GAS
Peter L. Paull, Weston, Conn., and John A. Klein, Downey, and Roger M. Dille, La Habra, Calif., assignors to Texaco Inc., New York, N.Y., a corporation of Delaware
Filed Dec. 4, 1967, Ser. No. 687,741
Int. Cl. C10k 3/00; B01d 47/00
U.S. Cl. 48—212                           17 Claims

ABSTRACT OF THE DISCLOSURE

Continuous process for recovering essentially all of the particulate carbon and other solids from a neutral or alkaline effluent stream of synthesis gas as a dispersion of carbon in crude oil for recycling as feed to the gas generator or for use as a fuel in the plant boilers or heaters. The particulate carbon is first contacted and collected in water made acidic (preferred pH range of greater than 4.5 to less than 7) by the addition of a water soluble acid such as acetic or formic acid supplied from an external source. A light hydrocarbon liquid is used to extract the carbon from the acidic water; and in turn, the crude oil is used to extract the carbon from the light hydrocarbon liquid-carbon dispersion. The process is fairly insensitive to the quality of the light hydrocarbon liquid and crude oil extractants which ordinarily contain impurities that form system upsetting emulsions in conventional processes.

BACKGROUND OF THE INVENTION

Field of the invention

This invention relates to the purification of synthesis gas prepared from hydrocarbonaceous fuels. More specifically it relates to improvements in a carbon recovery system employing liquid extraction for separating particulate carbon from an effluent stream of synthesis gas comprising principally carbon monoxide and hydrogen.

DESCRIPTION OF THE PRIOR ART

By the partial oxidation of a liquid hydrocarbonaceous fuel in the reaction zone of a synthesis gas generator, there is produced an effluent stream of raw synthesis gas comprising principally carbon monoxide and hydrogen, and containing from about 0.2 to 1.5 percent by weight of the carbon in the feedstock as unconverted entrained particulate carbon.

The effluent gaseous stream leaves the reaction zone at a temperature of from about 2000 to 3200° F. and is quickly cooled to a temperature of about 300 to 650° F. to avoid the formation of additional soot. This cooling of the effluent gas is usually accomplished by either direct quenching in water or by indirect counterflow heat exchange in a waste heat boiler. The efficient utilization of the sensible heat from the gases leaving the reaction zone has a large effect on the overall economics of the process.

When the synthesis gas is to be used as such, a waste heat boiler is usually employed to cool the effluent gases. When the synthesis gas is fed directly to a catalytic shift converter for conversion of $CO+H_2O$ to $H_2+CO_2$, a direct water quench system is simpler and more efficient. In addition to cooling the gas, the direct quench provides steam necessary for the water-gas shift reaction. When entrained carbon is removed from the cooled product gases by contacting the synthesis gas with water in gas-liquid contacting apparatus, economics require that the carbon be separated from at least a major portion of the water to permit reuse of the water and recovery of the carbon in a useful form. Vacuum filtration may be used to separate the carbon, but then the excessive water content in the filter cake (greater than 85 percent) will prevent its use without costly processing.

Liquid extraction of the carbon from the carbon-water dispersion offers many handling advantages, but it has been found that this method is critical with respect to pH of the system and the purity of the extracting fluids. For example, a conventional process employs a hydrocarbon liquid to extract the carbon so as to form a hydrocarbon-carbon slurry which is sent to a decanter to be separated from the clear water. The slurry is taken overhead from the decanter, mixed with heavy fuel oil, and then the light hydrocarbon liquid is distilled from the fuel oil in a stripping column. With certain combinations of hydrocarbon liquids and heavy fuel extractants, the decanter in such process fills up after a relatively short time on stream with a gel-like thick emulsion of water, carbon, and hydrocarbon liquid, and operation of the hydrocarbon stripper is upset. Furthermore, these emulsions cause a poor separation of the phases in the decanter, and the hydrocarbon liquid may be drawn from the bottom of the decanter rather than the clarified water. In such cases, there is no sharp interface between the phases so that continuous operation of the decanter becomes impossible. Furthermore, the water content in the hydrocarbon-carbon slurry fed to the distillation column will increase from a normal value of about 2 to 5 weight percent to an unmanageable 10 to 20%. Excessive water carry-over cools the still and upsets its normal operation. The quality and quantity of the overhead from the still are impaired and excessive water appears in the still bottoms. Emulsions, emulsifiers, and heavy fuel oil that pass overhead with the hydrocarbon enter the decanter and cause further difficulties.

SUMMARY OF THE INVENTION

By the improved carbon recovery system of our invention entrained particulate carbon in the effluent gaseous stream from the reaction zone of a synthesis gas generator is treated in such a way that it can be efficiently extracted from the water in which it is caught. Water soluble acid from an external source is added to the water in the carbon recovery system in an amount sufficient to prevent formation of system upsetting emulsions therein. The alkalinity of said water is thereby reduced preferably to a pH in the range of greater than 4.5 to less than 7. By the process of our invention, the entrained particulate carbon in the stream of raw synthesis gas may be reduced to less than three parts per million by weight of dry gas, and the carbon may be recovered in the form of a fuel oil-carbon pumpable slurry.

This invention is applicable to the following synthesis gas generating systems but is not limited thereto. In a first case where the effluent stream of raw synthesis gas from the reaction zone is cooled by means of a waste heat boiler, by the process of our invention the cooled gaseous stream is first contacted and wet with acidified water in a scrubbing zone comprising a mixing orifice or venturi which discharges into the bottom of a packed wash tower. Acidic water maintained at a preferred pH range of greater than 4.5 to less than 7, enters at the top of the wash tower and falls in direct contact with the rising product gases which leave from the top of the wash tower scrubbed free of carbon and ash. The acidic water-carbon slurry draw-off from the bottom of the wash tower contains less than one weight percent carbon. The remainder of the system is designed to recover the carbon from the acidic water-carbon dispersion as a freely flowing dispersion of carbon in fuel oil and to recycle the clear acidic water to the scrubbing zone, as will be described further in the next case.

In a second case, the effluent stream of raw synthesis gas from the generator reaction zone is cooled by direct immersion in water in a quench zone. By the process of our invention acidic water is used as the quenching medium and the quenched partially cleaned and cooled product stream is then further washed essentially free of carbon and ash in a scrubbing zone as described previously for the first case. The acidic water-carbon dispersion from the bottom of the wash tower is then recycled to the generator quench zone where most of the particulate carbon is first extracted from the effluent stream. Finally the acidic-water-carbon dispersion from the quench zone is processed to remove the carbon as a freely flowing dispersion of carbon in fuel oil, and the clear acidic water is recycled to the scrubbing zone. The carbon is extracted from the acidic water-carbon dispersion by mixing the dispersion with a light hydrocarbon liquid such as naphtha so as to form a light hydrocarbon-carbon-acidic water slurry and a clear acidic water phase which are easily separated in a decanting zone without forming decanter upsetting emulsions. The acidic water phase is purified and recycled to the scrubbing zone; and the light hydrocarbon-carbon-acidic water slurry may be recycled as feed to the reaction zone, or mixed with fuel oil and introduced into a distilling zone without forming emulsions that upset operation of the still. Light hydrocarbon overhead from the still is recycled to the decanting zone; and the fuel oil-carbon still bottoms may be pumped into the feedstream to the reaction zone to make more synthesis gas, or may be used as a fuel in the plant boilers or heaters.

It is therefore a principal object of the present invention to provide a continuous process for economically and efficiently recovering essentially all of the entrained particulate carbon and ash from large volumes of synthesis gas, which process operates at a pressure substantially the same as that at which the gas was generated.

Another object of this invention is to provide a method for recovering carbon from a stream of raw synthesis gas in a form suitable for use as a pumpable fuel useful in the generation of additional synthesis gas or as fuel for heating plant boilers or heaters.

A further object of this invention is to provide a carbon recovery process for purifying synthesis gas using light hydrocarbon liquid and fuel oil extractants, which process is fairly insensitive to the quality of said extractants and which is characterized by the absence of system-upsetting emulsions.

DESCRIPTION OF THE INVENTION

In the production of synthesis gas from liquid hydrocarbonaceous fuels, some free carbon is produced as the result of incomplete conversion in the generator. This is done partly to obtain a nearly optimum oxygen and fuel efficiency for the process and partly to sequester the vanadium and nickel which are present as ash components in residual oils. With heavy crude or fuel oils the operation is adjusted to yield 2 or 3 weight percent of the carbon in the unreacted feed oil as unconverted particulate carbon or soot in the raw product gas, leaving the combustion chamber. With lighter distillate oils, progressively lower carbon yields are taken. This soot yield is expressed on a once-through or fresh feed basis. Since it all may be recovered by the process of our invention and recycled back with fresh feed to the generator, there is no net yield of soot. The production of soot is a function of the oxygen/oil ratio and is relatively insensitive to pressure and steam/oil ratio. At constant oil feed rate the entire operating range of 1% to 4% soot yield may be obtained by only a 6% change in the oxygen feed rate.

In the process of our invention, the particulate carbon is first contacted and collected in acidic rather than basic water in the generator quench vessel or in a scrubber zone that may include a venturi or orifice scrubber and a wash tower through which the synthesis gas passes. The soot-laden acidic water at a preferred pH range of greater than 4.5 to less than 7 is then mixed with a light hydrocarbon liquid, such as naphtha; and the oleophilic quality of the soot phase will then cause it to go to the naphtha phase.

There must be enough mixing to displace the water with which the soot is first wet and replace it by the naphtha. This may be accomplished with a mixing valve, orifice, venturi, Ebaugh mixer, or baffled vessel. It is important that the contacting be complete, yet not too severe. Overmixing results in formation of very fine water droplets which will not settle out of the naphtha in a decanter, while undermixing will not produce a clean water stream from the bottom of the decanter. The naphtha-carbon phase (which may contain small amounts of the acidic water) goes from the decanter to a naphtha recovery stripper, to which heavy crude oil is also charged. After distillation of the naphtha (and any acidic water), the carbon is left in the oil; and this mixture commonly becomes part of the generator feed.

Light straight-run hydrocarbon liquids, from light naphtha to heavy kerosene depending upon the operating conditions of temperature and pressure, may be used to extract the carbon from the carbon-water slurry. These hydrocarbons may contain as impurities about 0.1 to 1% of various compounds, e.g., naphthenic and cresylic acids, phenols (such as the cresols, xylenols and higher homologues), and heterocyclic nitrogen compounds. In an alkaline system, we have found that these impurities act as emulsifiers which contribute to the formation of naphtha-carbon emulsions containing a high water content. By maintaining the carbon-water slurry at a pH of about 4.5 to less than 7 by the process of our invention these decanter-upsetting emulsions are avoided. The pH is kept as close to 7.0 as possible without forming the above emulsions.

Light hydrocarbon liquids are generally more expensive than heavy fuel oils as feedstock for the synthesis gas generator. Therefore, a low cost heavy fuel oil is mixed with the light hydrocarbon-carbon slurry and in a distillation column the light hydrocarbon is recovered for reuse. Heavy fuel oils suitable for use in this process include heavy distillates, crude oil, residual crude oil, Bunker and No. 6 fuel oils, reduced crude, vacuum residue, and hydrocracking bottoms. These fuel oils may contain as impurities about 0.1 to 1% naphthenic, cresylic, and other cyclic organic acids which form emulsifiers in an alkaline system. However, the small amount of acidic water carried into the distillation column by the light hydrocarbon-carbon slurry will generally prevent these impurities from becoming effective emulsificants. If desired, acid may be added directly to the distillation column, to prevent emulsions from forming, or to break any existing emulsions. Some of this acid will become part of the distillate that is recycled to the decanter, preventing emulsions from forming in the decanter.

When reference is made to the term "emulsions" throughout the specification and claims, it is to be understood to include the thick semi-solids and gel-like slurries that may form in the decanter from carbon, light hydrocarbon liquid, water, cyclic organic acid or soap sludges. Also included are non-Newtonian gels comprising about 94 weight percent water, heavy fuel ends, light hydrocarbon liquid, cyclic organic acids or soap, and carbon that may be found in the light hydrocarbon stripper.

The carbon in emulsions appears to consist of strings or other aggregations of small particles in a chain-like formation that stabilize the gel; and, as the carbon content is increased, the emulsion problem is aggravated. Electron micrographs show the carbon particles to resemble hollow spheres or "sponge-like" structures about 70 millimicrons in diameter. Due to this structure the carbon has a high surface area, about 600 to 800 square meters per gram or 25 acres per pound. The carbon varies in surface area depending on generator operating conditions. Generally the surface area is related to the oil adsorption number, as determined by ASTM Method D-281. It may be expressed as gallons of oil absorbed/100 pounds of dry carbon. Typical carbon blacks made by the partial oxidation process vary from 20–50 gallons/100 pounds. The surface area of the carbon also limits the loading of carbon in fuel oil. Because of the high adsorption number, slurries of the carbon in water or hydrocarbon tend to become gels at low carbon concentrations. Analysis of several soots produced in yields of 1.8 to 3.5 percent from various residual fuels follows:

|  | Percent |
|---|---|
| Carbon | 92.3–93.4 |
| Hydrogen | 0.35–1.05 |
| Sulfur | 0.27–0.59 |
| Ash [1] | 3.36–4.64 |
| Total [2] | 96.8–99.9 |

[1] Largely compounds of Ni, V, Na and Fe.
[2] Oxygen not accounted for.

Particulate carbon or soot is both oleophilic and hydrophilic, but its oleophilic properties are much stronger. Whereas, a gram of soot will absorb 2–3 cc. of oil, it will also absorb large amounts of water. The oleophilic property of the particulate carbon is used in the process of our invention to transfer the carbon from the water phase to the oil phase.

The nature of the soot surface seems easily altered by absorbing polar materials so as to increase the hydrophilic tendency of the soot. Absorption of nitrogen compounds, and possibly phenolic or other oxygen compounds from a light hydrocarbon liquid extractant such as naphtha, appear to increase sharply the tendency of the soot to stabilize emulsions in the decanter, probably because of the increase in the hydrophilic character of the normally oleophilic soot. At higher pH's the dispersant properties of the particulate carbon appear to increase. When the high-area soot particle becomes coated with a surfactant soap, derived in alkaline systems from the naphthenic and cresylic acids present in heavy fuel oil, its properties as an emulsificant are greatly enhanced. Thus the tendency of the carbon to promote naphtha-carbon-water emulsions increases, and the emulsion layer in the decanter becomes thicker and more stable.

Should there be a high concentration of soluble $Fe^{++}$ in the circulating water system, it is also advantageous to keep the system acidic by the process of our invention. In basic water, insoluble $FeS$ and $Fe(OH)_2$ precipitate out, in and on the surface of the particulate carbon. The naphtha no longer then attracts the soot as well as it should. The soot starts recirculating with the water; and the decanter becomes troubled by emulsions and loss of naphtha-water interface.

It is important to eliminate oxygen from all parts of our system, especially the circulating-water system. Oxygen not only causes increased corrosion but contributes to emulsion problems. Absorption of oxygen compounds or oxidation of surface compounds increases sharply the tendency of soot to stabilize emulsions in the decanter. By means of chemical agents such as hydrazine and sodium sulfide, traces of oxygen may be scavenged from all feedstreams except the raw synthesis gas which is already oxygen-free. The carbon-extraction unit should be maintained as a closed system with air excluded and blanketed with nitrogen. Furthermore, the input streams of acid, water, and liquid extractants, should be deaerated.

Acids particularly suitable for acidifying the system in accordance with the process of our invention include short-chain water-soluble organic acids such as acetic, formic, and carbonic acids. Other acids may be used if provision in the system is made to accommodate them—for example, by using corrosion resistant materials. Buffered acid systems such as phosphoric and boric acids may be used provided insoluble compounds and scale deposits are avoided. The quantity of acid required to maintain the pH of the system in the range of about 4.5 to less than 7 is generally only about 0.05 to 0.5 weight percent, depending on such variables as type of acid and concentration, composition of feedstock to the generator, generator pressure, volume and character of water in the circulating system, and composition and quantity of product gas.

Although the process of our invention is adaptable to removing substantially all of the entrained carbon and solids from the effluent gaseous stream produced by many hydrocarbon gasification processes well known in the art, it is particularly suitable for the partial oxidation process which employs a wide variety of feedstocks including natural gas, propane, butane, various petroleum distillates and residua, lignite, bituminous and anthracite coals, naphtha, gas oil, residual fuel, reduced crude, whole crude, coal tar oil, shale oil and tar sand oil.

A more complete understanding of the invention may be had by reference to the accompanying schematic drawing which describes the two previously mentioned cases in greater detail. In case 1, there is illustrated by solid lines a preferred arrangement of flow and apparatus for effecting the process of the invention when the raw synthesis gas feedstream to the carbon removal system is produced in the reaction zone of a gas generator and is cooled by means of indirect heat exchanger, such as by a waste heat boiler (not shown). In case 2, dotted lines on the drawing are used to show changes in the flow lines of case 1 for effecting the process of the invention when the raw synthesis gas feedstream to the carbon removal system is produced in the reaction zone of a gas generator and cooled by direct quenching in acidified water (not shown). It is not intended to limit the invention to the particular apparatus or material described.

In case 1, the raw synthesis gas leaving the reaction zone of a gas generator at a temperature in the range of about 2000 to 3200° F. is cooled by indirect heat exchange in a waste heat boiler to a temperature of about 300 to 650° F. (not shown). The product stream comprises principally equimolar quantities of carbon monoxide and hydrogen and contains about 1.0 weight percent of particulate carbon, basis carbon in the feedstock. At substantially generator pressure, the raw synthesis gas stream leaving the waste heat boiler enters line 1, the inlet to the scrubbing section of the carbon removal system. In case 1, the scrubbing section comprises mixer 2 and wash tower 5. All or part of the particulate carbon in the raw synthesis gas stream is extracted with acidified water that is atomized by the gas in the nozzle, orifice, or venturi mixer 2. The discharge from mixer 2 passes through line 4 and into wash tower 5 where the gas stream ascends in countercurrent flow in direct contact with a descending stream of water which may also be kept in the acid state. In those cases where all of the solids are extracted from the gas by the action of mixer 2, the washing section of tower 5 may be deleted and the tower may be then used merely to separate the purified gas from the scrub waters.

The water in the scrubbing section is acidified with a suitable acid solution such as acetic or formic acid solution which may be introduced into the system for example at line 6. Other points where acid solution may be added to the system will be discussed later. With valve 7 in line 8 closed, the acid solution is pumped through lines 9, 10 and 3 by means of pump 11 and mixed in line 3 with acidic water pumped from the lower part of wash tower 5 through lines 12, 13, 14 and 10, by means of pump 15. A portion of the acetic acid solution in line 6 may be directed to wash tower 5 by way of lines 9, 14, and 16 and mixed with a portion of down flowing acidified water from wash tower 5 which is recycled by way of line 12, pump 15, and lines 13 and 16. Also recycle water is introduced into the top of wash tower 5 through line 17 and will be further described. The cooled cleaned synthesis gas leaves through line 18 at the top of the tower and may be used as feedstock for water-gas shift or synthesis reactions. The gas is now substantially free from entrained particulate carbon and other solids which might otherwise deposit on catalysts and interfere with chemical reactions. The dispersion or slurry of carbon in acidic water that is produced by the previously mentioned wetting and scrubbing steps contains a maximum of about 1.5 weight percent of carbon, basis carbon in the feedstock. With valve 19 in line 20 closed, this slurry leaves at the bottom of wash tower 5 by line 21 at a temperature of about 150 to 175° C. and at a pH in the range of greater than 4.5 to less than 7. With valves 22 and 23 closed in lines 24 and 25 respectively and valve 26 in line 27 open, the slurry is conducted through lines 28 and 27, valve 26 and lines 29 and 30 into exchanger 31 where its temperature is reduced to about 125° C. The stream of acidic water-carbon slurry in line 32 and the stream of light hydrocarbon liquid from line 33 are combined in line 34, thoroughly mixed by mixing valve 35, and passed through line 36 into decanter 37, at a temperature of about 110 to 130° C. Being more oleophilic than hydrophilic, the carbon particles leave the acidic water-carbon slurry and are adsorbed by the light hydrocarbon liquid. The light hydrocarbon-carbon phase, containing a maximum of about 2.5 weight percent of carbon and usually less than about 5 weight percent of acidic water, floats on the acidic water phase and may be drawn off from the top of decanter 37 through line 38. The acidic water phase containing about .05 weight percent light hydrocarbon is withdrawn from the bottom of decanter 37 through line 39 and is introduced into flash tank 40.

By suddenly dropping the pressure on the water as it passes through control valve 80 into tank 40, from for example 20 atmospheres to about 2 atmospheres, any small amount of light hydrocarbon dissolved in the acidic water is steam distilled off and discharged from the system through line 41 at the top of tank 40. Clear acidic water free from light hydrocarbon leaves from line 81 at the bottom of tank 40 at a temperature of about 100 to 110° C. and may be recycled back to wash tower 5 by means of pump 43. With valves 44 and 82 closed and valve 46 in line 47 open, the acidic water is pumped through lines 42, 48 and 47, valve 46, line 49 and exchanger 50 where its temperature is reduced to about 30° C., entering wash tower 5 through line 17 near the top of the tower. Blowdown from the system may be taken periodically by way of lines 8, 82 and 83 and open valve 84 in order to control total dissolved solids.

Any water entrained in the light hydrocarbon-carbon slurry from decanter 37 may be removed by a conventional method such as settling and the remaining slurry may be recycled as feed to the synthesis gas generator. However, when this is uneconomical, the light hydrocarbon may be recovered from the slurry by distillation and recycled for reuse in extracting carbon from acidic water-carbon slurry as previously described. This may be accomplished in the section of the carbon recovery system beginning at inlet line 51. There, fuel oil is introduced into the system, heated to a temperature of about 150° C. in heat exchanger 52, and passed through line 53, open valve 54, line 55, and into line 56. The fuel oil is combined in line 56 with the light hydrocarbon-carbon slurry containing about 2.5 weight percent of carbon and usually less than 5 weight percent of entrained acidic water from lines 38, open valve 57, and line 58. Mixing of these streams is accomplished by means of valve 59, and the light hydrocarbon-carbon-entrained acidic water mixture is discharged into distillation column 60 by way of line 61. Distillation column 60 is equipped with reboiler 62. The overhead from the column leaves through line 63 and is condensed by exchanger 64. The distillate comprises essentially the light hydrocarbon liquid extractant along with about 4 weight percent of acidic water; a fractional amount of organic impurities in the fuel oil, such as phenols, naphthenic acid and cresylic acid which cannot be easily separated from the light hydrocarbon and water may be distilled over with them.

Part of the distillate is returned to column 60 through line 65 and the remainder passes through line 66 into accumulator tank 67. Make-up light hydrocarbon enters the system by way of line 68. The bottoms in distillation column 60 comprises substantially fuel oil with about 4 weight percent of carbon and about 1 weight percent of light hydrocarbon liquid and are discharged through line 69 at a temperature of about 230° C. The fuel oil carbon bottoms depart through line 69, exchanger 52 and line 70 and may be combined with the fuel oil feed and pumped back to the synthesis gas generator (not shown) or burned as fuel in plant boilers or heaters.

In case 2, the raw synthesis gas leaving the reaction zone is cooled immediately by direct quenching in acidic water held in a quench tank (not shown). This cooling procedure eliminates the indirect heat exchanger wasteheat boiler) used in case 1 (also not shown). With valve 26 in line 27 closed, acidified water for the quench section of the generator is supplied by a portion of the acidic water-carbon dispersion leaving wash tower 5 by way of lines 21, 28, 24, open valve 22, and line 71. The remainder of the acidic water-carbon dispersion from line 21 is recycled to the wash tower 5 by way of line 20, open valve 19, and lines 72, 73, 74, and 75. A portion of the clear acidic water from the bottom of the flash tank 40 may be recycled to orifice scrubber 2 by way of line 42, pump 43, lines 48 and 45, open valve 44, lines 76 and 77, open valve 7, and lines 8 and 3.

In case 2, the scrubbing section comprises the quench section of the generator in addition to mixer 2 and wash tower 5 as previously described in case 1. The concentration of the carbon builds up in the quench section of the generator (not shown) to a maximum of 1.5 weight percent carbon dispersed in acidic water. With valve 26 in line 29 closed, the carbon is recovered by introducing the acidic water-carbon dispersion into the recovery system as previously described through line 78, open valve 23, and lines 25 and 30. The raw synthesis gas from the quench section of the generator is introduced into the carbon recovery system by way of line 1, and any remaining entrained carbon is removed in the manner described in case 1.

When necessary to offset particularly high concentrations of emulsificant forming organic impurities in the fuel oil, supplementary additions of acid solutions may be made at one or more other points in the system, for example into fuel oil inlet line 51, or into light hydrocarbon inlet line 68. In the event emulsions have already formed in decanter 37 or distillation column 60 then acid solution injected directly into either or both units will help to break the emulsion.

DESCRIPTION OF THE PREFERRED EMBODIMENT

As a specific example of the present invention, a feedstream of 19,900 Nm³/hr. of ray synthesis gas comprising substantially by volume percent $H_2$—42.7; CO—39.9; $CO_2$—4.4; $H_2O$—11.74 and containing 99.5 kg./hr. of unreacted entrained particulate carbon is produced by reacting 5700 kg./hr. of fuel oil having an API gravity of 20.0 with 6,500 Nm.³/hr. of 95 vol. percent oxygen in a conventional unpacked noncatalytic synthesis gas generator at a pressure of 41 atmospheres. The process oil has a gross heating value of 18,700 B.t.u. per pound and an ultimate analysis, in weight percent, of C—86.3, $H_2$—11.8, S—1.60, N—0.28 and ash—.02. The effluent gaseous stream from the generator reaction zone is cooled in an indirect waste heat boiler from a temperature of about 1330° C. to about 340° C. and then introduced into the carbon recovery system of our invention as illustrated in the drawing.

By means of a mixing orifice, the gaseous feedstream is first wet with a stream of 24,100 kg./hr. of acidic water. The combined gas and liquid streams are then discharged into a wash tower at 37 atmospheres pressure where the ascending stream of gases are scrubbed with a descending stream of 75,700 kg./hr. of acidic water at a temperature of 30° C. About 23 liters/hr. of 100% acetic acid are injected into the wash and scrub waters to maintain them at a pH of about 6.5.

Acidic water-carbon slurry is drawn from the bottom of the wash tower at a temperature of about 166° C., comprising about 21,700 kg./hr. of $H_2O$ and 99 kg./hr. of carbon. The temperature of the acidic water-carbon slurry is reduced to about 130° C. and passed with 3660 kg./hr. of naphtha at 70° C. through a mixing valve set at about ½ atm. pressure drop to assure good mixing. The pressure drop across the mixing valve is adjustable from 0 to 50 p.s.i., in order to vary the degree of mixing. The fresh naphtha may have the following specification: °API—76.8 to 79.7; IBP—140° F. to 150° F., 50%—152 to 162° F., and EP—190 to 230° F.

The combined stream comprising naphtha and acidic water-carbon slurry is discharged into a decanter of such volume as to provide a sufficient residence time for phase separation to occur at the given flow rates. Also, the design of the decanter is such as to avoid excessive turbulence of liquid therein. Carbon is extracted from the acidic water-carbon slurry; and, a naphtha-carbon slurry, containing small amounts of entrained acidic water is formed which floats on the clear acidic water phase that contains some naphtha and carbon. The naphtha-carbon-acidic water slurry is drawn from the top of the decanter at the following rate in kg./hr.: naphtha—3650, carbon—99, and acidic water—183. This stream is combined with about 2920 kg./hr. of fuel oil at a temperature of 150° C. The combined streams are then thoroughly mixed in a mixing valve and introduced into a naphtha distillation column.

The clear water phase in the decanter is drawn off at the following rate in kg./hr.: water—21,517 kg./hr.; naphtha—10 kg./hr.; and carbon—3 mg./l. and is introduced into a flash tank while the pressure is dropped from about 16 atm. to 1.2 atmosphere. At a temperature of 104° C., 10 kg./hr. of naphtha and about 670 kg./hr. of steam are flashed from the top of the tank. About 19,800 kg./hr. of clear acidic water is pumped from the bottom of the tank and recycled to the wash tower.

The distillate from the naphtha stripper at a temperature of 104° C. comprises in naphtha—4425 kg./hr. and acidic water—183 kg./hr. About 800 kg./hr. of this distillate is recycled back to the top tray of the naphtha still and the remainder recycled to the decanter to extract more carbon from the acidic water-carbon slurry as previously described. The still bottoms comprise in kg./hr.: fuel oil—2920; naphtha—25; and carbon—99.

In order to show the advantages of our invention, acid injection is stopped and the system is allowed to run at its equilibrium pH value. With all conditions stable the pH of the scrub water then increases to 7 and above within a few hours, and system-upsetting emulsions form in the decanter and in the naphtha still. The interface boundary level between the naphtha-carbon phase and the clear water phase in the decanter becomes less well defined, and a dense gel-like thick emulsion of water, carbon, and naphtha forms between the above two phases. The quantity of water entrained in the naphtha-carbon slurry feed to the naphtha stripper increases from a normal of about 2.5 weight percent to about 8 to 12 percent, or even higher. The increased heat load required to vaporize the excessive amount of water causes the stripper temperature to decrease and the stripper to become overloaded. This overloaded condition can become so serious that the stripper becomes inoperative and the overhead naphtha is no longer suitable for the extraction step.

The upset system may be brought back to normal operation by starting the acid pump. As acetic acid is added to the wash and scrub waters, the pH of the system is brought down in steps to a pH of 6.5, the interface boundary level in the decanter returns to its proper place, and the still regains normal operation. Lowering the pH of the system below 4.5 does not seem to offer any improvement, is unnecessarily costly, and may result in corrosion of the metal piping and tanks.

The process of the invention has been described generally and by examples with reference to liquid hydrocarbon feedstocks, effluent synthesis gas streams, liquid extractants, and various other materials of particular compositions for purpose of clarity and illustration only. From the foregoing it will be apparent to those skilled in the art that the various modifications of the process and the materials disclosed herein can be made without departure from the spirit of the invention.

We claim:

1. A proces for recovering essentially all of the unconverted particulate carbon in an effluent gaseous stream comprising carbon monoxide and hydrogen as produced by the partial oxidation of a hydrocarbonaceous fuel in the reaction zone of a synthesis gas generator, which comprises:
   (1) scrubbing essentially all of said particulate carbon from said effluent gas stream in a gas scrubbing zone with acidic water forming a dispersion of particulate carbon in acidic water, and separating said cleaned effluent gaseous stream from said acidic water-carbon dispersion,
   (2) mixing the acidic water-carbon dispersion of (1) with a light hydrocarbon liquid in a mixing zone forming a light hydrocarbon liquid-carbon slurry containing entrained acidic water, and a clarified acidic water phase containing as an impurity a fractional amount of said light hydrocarbon liquid; and
   (3) separating the clarified acidic water phase of (2) from the light hydrocarbon liquid-carbon slurry containing entrained acidic water of (2) in a decanting zone.

2. The process of claim 1 in which the acidic water of (1), (2), and (3) is maintained at a pH in the range of greater than 4.5 to less than 7.

3. The process of claim 1 wherein said acidic water is prepared by introducing into said scrubbing zone an acid selected from the group of acids consisting of acetic, formic, and carbonic.

4. The process of claim 1 wherein said acidic water is prepared by introducing into said scrubbing zone an acid selected from the group of acids consisting of hydrochloric and sulphuric.

5. The process of claim 1 wherein said acidic water is prepared by introducing into said scrubbing zone an acid selected from the group of acids consisting of boric and phosphoric.

6. The process of claim 1 wherein the scrubbing in said gas scrubbing zone of (1) is effected by contacting said effluent gaseous stream with a first stream of said acidic water in a turbulent mixing zone, and then by introducing said mixed streams into a washing zone where said gaseous stream separates from said acidic water-carbon dispersion and is then washed by countercurrent direct contact with a second stream of said acidic water.

7. The process of claim 1 wherein the scrubbing in said gas scrubbing zone of (1) is effected by first contacting said effluent gas stream with acidic water in a quence zone of said synthesis gas generator at a temperature of about 300 to 650° F. so as to form a dispersion of particulate carbon in acidic water and a stream of raw synthesis gas containing a substantially reduced amount of particulate carbon; and introducing said stream of raw synthesis gas into a turbulent mixing zone where it is contacted with acidic water which removes substantially all of said remaining particulate carbon.

8. The process of claim 7 with the added step of introducing the stream of raw synthesis gas from said turbulent mixing zone into a washing zone where said gaseous stream separtes from said acidic water-carbon dispersion and is then washed by countercurrent direct contact with more acidic water.

9. The process of claim 1 with the added steps of removing essentially all of the entrained acidic water from said light hydrocarbon liquid-carbon slurry of (3) and recycling said slurry to the reaction zone of said synthesis gas generator in admixture with said hydrocarbonaceous fuel.

10. The process of claim 1 with the added steps of treating the clarified acidic water of (3) in a vaporizing zone to remove essentially all of said light hydrocarbon liquid impurity; and recycling said purified acidic water to said scrubbing zone to contact said effluent gaseous stream.

11. The process of claim 1 with the additional steps of mixing the light hydrocarbon liquid-carbon slurry containing entrained acidic water of (3) with a heavy hydrocarbon liquid in a second mixing zone; introducing said mixture into a distilling zone; and separately withdrawing thereform an overhead mixture of light hydrocarbon liquid and acidic water, and a bottoms slurry comprising heavy hydrocarbon liquid and carbon.

12. The process of claim 11 in which the separated mixture of light hydrocarbon liquid and acidic water is recycled back to the mixing zone of (2) in order to extract carbon from said acidic water-carbon dispersion.

13. The process of claim 11 in which the heavy hydrocarbon liquid-carbon slurry is recycled back to the reaction zone of the synthesis gas generator in admixture with said hydrocarbonaceous fuel.

14. The process of claim 12 wherein supplementary additions of an acid from the group of acids comprising acetic, formic, carbonic, sulfuric, and hydrochloric are made to said distilling zone as an emulsion forming preventative.

15. The process of claim 1 in which the system is maintained in a deaerated condition.

16. The process of claim 1 including the step of oxygen scavenging all feedstreams except the effluent gas stream from the reaction zone of the gas generator.

17. In a process for recovering unconverted particulate carbon from an effluent gaseous stream comprising carbon monoxide and hydrogen by scrubbing with water essentially all of said particulate carbon from said effluent gas stream in a gas scrubbing zone thereby forming a dispersion of particulate carbon in water, and separating said cleaned effluent gaseous stream from said water-carbon dispersion; mixing said water-carbon dispersion with a light hydrocarbon liquid in a mixing zone forming a light hydrocarbon liquid-carbon slurry and a clarified water phase; and separating the clarified water phase from said light hydrocarbon liquid-carbon slurry in a decanting zone; the improvement in said method of operation which comprises reducing the pH of the water in said scrubbing zone by the addition of a water soluble acid in an amount sufficient to prevent formation of a light hydrocarbon liquid-carbon-water emulsion in said decanting zone.

References Cited

UNITED STATES PATENTS

| 2,504,019 | 4/1950 | Hall | 252—330 X |
| 2,793,938 | 5/1957 | Frank | 23—212 |
| 2,992,906 | 7/1961 | Guptill | 48—196 |
| 2,999,741 | 9/1961 | Dille et al. | 48—196 |
| 3,414,523 | 12/1968 | Jockel | 252—330 X |

MORRIS O. WOLK, Primary Examiner

J. D. OLSEN, Assistant Examiner

U.S. Cl. X.R.

48—196, 214; 55—22, 89, 85